United States Patent
Gambetta et al.

(10) Patent No.: US 11,321,625 B2
(45) Date of Patent: May 3, 2022

(54) QUANTUM CIRCUIT OPTIMIZATION USING MACHINE LEARNING

(71) Applicant: International Business Machines Corporation, Armonk, NY (US)

(72) Inventors: Jay M. Gambetta, Yorktown Heights, NY (US); Ismael Faro Sertage, Chappaqua, NY (US); Ali Javadiabhari, Sleepy Hollow, NY (US); Francisco Jose Martin Fernandez, Chappaqua, NY (US); Peng Liu, Yorktown Heights, NY (US); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 636 days.

(21) Appl. No.: 16/394,133

(22) Filed: Apr. 25, 2019

(65) Prior Publication Data

US 2020/0342344 A1  Oct. 29, 2020

(51) Int. Cl.
*G06N 10/00* (2022.01)
*B82Y 10/00* (2011.01)

(52) U.S. Cl.
CPC .............. *G06N 10/00* (2019.01); *B82Y 10/00* (2013.01)

(58) Field of Classification Search
CPC ......... G06N 10/00; G06N 20/00; B82Y 10/00
(Continued)

(56) References Cited

U.S. PATENT DOCUMENTS 8,712,942 B2  4/2014  Fiske
10,095,981 B1  10/2018  Garrison et al.
(Continued)

FOREIGN PATENT DOCUMENTS

WO  2017171826 A1  10/2017

OTHER PUBLICATIONS

Biamonte, J., Wittek, P., Pancotti, N., Rebentrost, P., Wiebe, N., & Lloyd, S. (2017). Quantum machine learning. Nature, 549(7671), 195.
(Continued)

*Primary Examiner* — Tan V Mai
(74) *Attorney, Agent, or Firm* — Garg Law Firm, PLLC; Rakesh Garg; Joseph Petrokaitis

(57) ABSTRACT

A hybrid data processing environment comprising a classical computing system and a quantum computing system is configured. A configuration of a first quantum circuit is produced from the classical computing system, the first quantum circuit being executable using the quantum computing system. Using the quantum computing system, the first quantum circuit is executed. Using a pattern recognition technique, a portion of the first quantum circuit that can be transformed using a first transformation operation to satisfy a constraint on the quantum circuit design is identified. The portion is transformed to a second quantum circuit according to the first transformation operation, wherein the first transformation operation comprises reconfiguring a gate in the first quantum circuit such that a qubit used in the gate complies with the constraint on the quantum circuit design while participating in the second quantum circuit. Using the quantum computing system, the second quantum circuit is executed.

20 Claims, 9 Drawing Sheets

(58) Field of Classification Search
USPC .......................................................... 708/802
See application file for complete search history.

(56) References Cited

U.S. PATENT DOCUMENTS

| | | | |
|---|---|---|---|
| 10,176,433 B2 | 1/2019 | Hastings et al. | |
| 10,210,308 B2 | 2/2019 | Van Rooyen et al. | |
| 2009/0087084 A1* | 4/2009 | Neigovzen | G06K 9/62 |
| | | | 382/159 |
| 2017/0109605 A1* | 4/2017 | Ahn | G06V 10/44 |
| 2018/0373578 A1 | 12/2018 | Bridges et al. | |
| 2021/0342730 A1* | 11/2021 | Redmond | G06N 3/0454 |
| 2021/0398621 A1* | 12/2021 | Stojevic | G06N 3/0472 |

OTHER PUBLICATIONS

Olivares-Sánchez, J., Casanova, J., Solano, E., & Lamata, L. (2018). Measurement-based adaptation protocol with quantum reinforcement learning in a Rigetti quantum computer. arXiv preprint arXiv:1811.07594.

* cited by examiner

QUANTUM CIRCUIT OPTIMIZATION USING MACHINE LEARNING

TECHNICAL FIELD

The present invention relates generally to a method, system, and computer program product for quantum programming. More particularly, the present invention relates to a method, system, and computer program product for quantum circuit optimization using machine learning.

BACKGROUND

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational operations. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing. Herein, a qubit is the physical carrier of quantum information. A qubit is the quantum version of a bit in classical computing, and can have quantum states of $|0\rangle$, $|1\rangle$, or the linear combination of both.

Quantum computing can often be used to solve problems more quickly than in conventional computing. For example, one quantum algorithm is Grover's Search, which accomplishes searching through an unordered list of N items with fewer lookups than is the case in conventional computing.

Quantum gates are the elementary building blocks for quantum computation, acting on qubits the way classical logic gates act on bits, one and two at a time, to change qubit states in a controllable way. An X gate inverts the state of a single qubit, much like a NOT gate inverts the state of a single bit in classical computing. An H gate, or Hadamard gate, puts a single qubit into a state of superposition, a combination of the 0 and 1 quantum states. The qubit only resolves to a definite state when measured. For example, when provided with an input having a quantum state of 0, within the Hadamard gate the quantum state is in superposition, but the output has a 50 percent probability of being in the quantum 0 state and a 50 percent probability of being in the quantum 1 state. Other single-qubit gates alter the qubit state in other defined ways.

Multi-qubit gates implement gates that perform conditional logic between qubits, meaning the state of one qubit depends on the state of another. For example, a Controlled-NOT, or CNOT gate, has two qubits, a target qubit and a control qubit. If the control qubit is in the 1 quantum state, the CNOT gate inverts the state of the target qubit. If the control qubit is in the 0 quantum state, the CNOT gate does not change the state of the target qubit.

Multiple qubits can also be entangled. Two or more qubits are entangled when, despite being too far apart to influence one another, they behave in ways that are individually random, but also too strongly correlated to be explained by supposing that each object is independent from the other. As a result, the combined properties of an entangled multi-qubit system can be predicted, but the individual outcome of measuring each individual qubit in such a system cannot.

Similar to conventional computing, quantum computing gates can be assembled into larger groups, called quantum circuits, to perform more complicated operations. For example, a SWAP gate, which exchanges the states of a pair of qubits, can be constructed from three CNOT gates.

Quantum circuits can perform some operations in parallel, and some in series. The length of the longest series in the program is also referred to as the depth of the quantum circuit. For example, the three CNOT gates comprising a SWAP gate are arranged in series, giving a depth of 3. Programs with a shallower depth take less execution time and provide better performance, so are preferred.

Conventional computers do not have to be hand-programmed with specific instruction steps, such as those provided in processor-specific assembly languages. Instead, programmers write hardware-independent code in a higher-level language, and a compiler translates this code into assembly language for execution on a specific processor. Similarly, in quantum computing programmers do not have to specify individual gates. Instead, programmers can write higher-level code in a higher-level language. A compiler parses this code and maps it into a quantum circuit. Finally, a quantum processor executes the quantum circuit. Quantum programmers can also make use of already-programmed libraries, for use in solving problems in areas such as chemistry, artificial intelligence, and optimization.

SUMMARY

The illustrative embodiments provide a method, system, and computer program product. An embodiment includes a method that configures a hybrid data processing environment comprising a classical computing system and a quantum computing system. An embodiment produces a configuration of a first quantum circuit from the classical computing system, the first quantum circuit being executable using the quantum computing system. An embodiment executes, using the quantum computing system, the first quantum circuit. An embodiment scores, to produce a first score, a result of executing the first quantum circuit. An embodiment identifies, using a pattern recognition technique, a portion of the first quantum circuit that can be transformed using a first transformation operation to satisfy a constraint on the quantum circuit design. An embodiment transforms, to a second quantum circuit according to the first transformation operation, the portion, wherein the first transformation operation comprises reconfiguring a gate in the first quantum circuit such that a qubit used in the gate complies with the constraint on the quantum circuit design while participating in the second quantum circuit. An embodiment executes, using the quantum computing system, the second quantum circuit.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
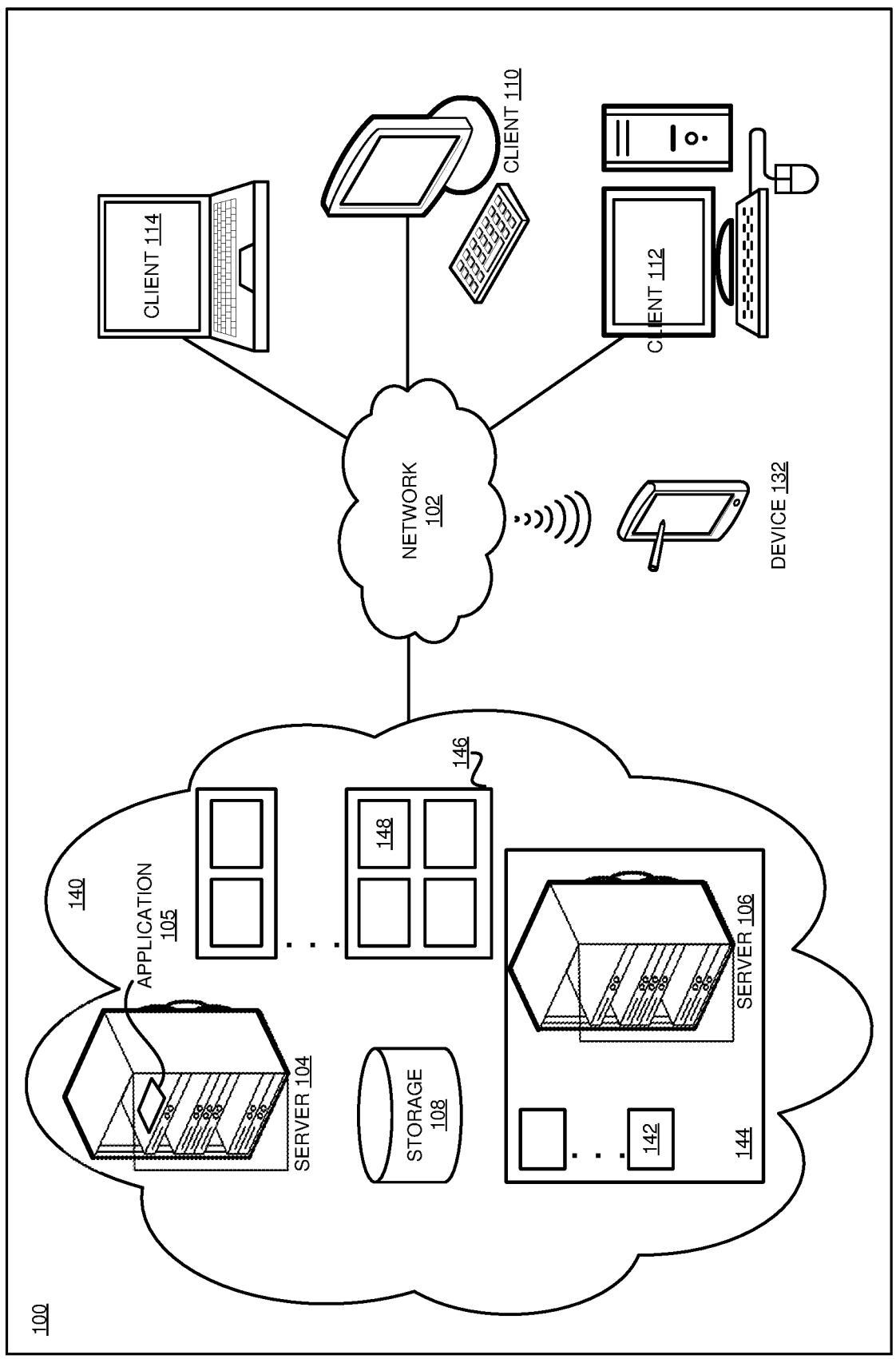
FIG. 1 depicts a block diagram of a network of data processing systems in which illustrative embodiments may be implemented.

The illustrative embodiments recognize that the quantum circuit produced by a compiler is not necessarily the most efficient quantum circuit capable of producing the same result. Just as optimizing compilers optimize compiled code for conventional processors, so too a transpiler is needed to optimize quantum circuits meant to run on quantum processors. As used herein, transpilation refers to transforming a quantum circuit into another quantum circuit that produces the same outputs from the same inputs as does the original quantum circuit. Optimizing refers to refining a quantum circuit so that its execution incurs lower cost, typically by taking less time to execute, while maintaining accuracy—e.g., by using a configuration of different or fewer qubits to minimize interference or decoherence, or some combination thereof. As used herein, accuracy refers to consistency with previous results of a quantum circuit. Accuracy is synonymous with correctness.

Compiler optimizations for classical programs, such as classical dataflow based optimizations and stochastic optimizations, do not apply to quantum circuits because outputs from the two types of programs differ. For classical programs, the program state is deterministic and the output is simply the program state when execution completes. For quantum circuits, the program state represents a probability distribution of all possible outcomes, and the output is merely a sample from the distribution. As a result, outputs change from run to run non-deterministically.

Existing techniques for optimizing quantum circuits follow ad-hoc heuristics, relying on correctness-preserving rules or templates specified by human experts. However, such ad-hoc heuristics are simply methods that have been successful, more times than not, in optimizing quantum circuits in the past. Such methods are not guaranteed to be equally successful in optimizing quantum circuits in the future.

The illustrative embodiments also recognize that optimizations are often pattern-based. In other words, a portion of a quantum circuit that matches a particular pattern can often be improved by replacing that particular portion with a known replacement. For example, one particular configuration of three CNOT gates is known to be equivalent to another particular configuration of two CNOT gates. As a result, if a portion of a quantum circuit matches the particular three-CNOT configuration, the portion can be replaced with the equivalent two-CNOT configuration. Removing a gate from the circuit in this manner often improves circuit efficiency. Thus, the illustrative embodiments recognize that if a pattern-based circuit change can be found useful, the change should be learned from, to improve future quantum circuits.

The illustrative embodiments also recognize that a compiler often produces a generic quantum circuit. Such a generic quantum circuit is not specific to a particular quantum processor configuration. Each quantum processor, although having the same hardware configuration (e.g. having the same number of qubits), can have varying properties. Such properties, such as how long a qubit can remain in a particular quantum state before decaying to another quantum state, how long a qubit can remain in a superimposed state before decaying to a particular quantum state, the frequency of a particular qubit, gate error (i.e. the rate at which a quantum gate or operation gives an incorrect result), and the like, change over time. Quantum processors require periodic calibration to account for this variability. Thus, the illustrative embodiments recognize that such calibration results can affect the performance of a quantum circuit. In addition, some successful transpilations are circuit-specific, so a successful transpilation's dependence on a particular quantum processor configuration or calibration should be tracked.

The illustrative embodiments also recognize that a provider may want to modularize quantum circuit optimizations. Quantum computing is a rapidly evolving field. Modularization allows for ease of adaptation to additional quantum processor configurations, such as processors with additional qubits or qubit coupling options. Modularization also allows for the rapid implementation of additional optimization techniques as such optimizations are developed.

As a result, what is needed in the art is a technique for transpiling quantum circuits to optimize such circuits in a modular manner that uses machine learning to improve the optimizations based on previous optimization results. The technique should also be adaptable to a particular quantum processor configuration.

The illustrative embodiments recognize that the presently available tools or solutions do not address these needs or provide adequate solutions for these needs. The illustrative embodiments used to describe the invention generally address and solve the above-described problems and other problems related to modular quantum circuit optimization.

An embodiment can be implemented as a combination of certain q-computing hardware components and a software application. An implementation of the software application portion of an embodiment, or one or more components thereof, can be configured as a modification of an existing classical portion of a hybrid quantum-classical processing environment, as a separate classical computing application that operates in conjunction with an existing hybrid quantum-classical processing environment, as a standalone application, or some combination thereof.

Particularly, some illustrative embodiments provide a method by which a quantum circuit is transformed, or transpiled, into another quantum circuit having equivalent output, but better performance, than the original.

An embodiment configures a hybrid data processing environment including a classical computing environment and a quantum computing environment. In accordance with the illustrative embodiments, the environment includes at least one quantum compute node (QCN), and at least one conventional node (CN) on which an embodiment can execute. Such a computing environment is hereinafter referred to as a quantum computing environment (QCE). The QCE may include one or more CNs in a suitable configuration—such as a cluster—to execute applications using conventional binary computing. The hybrid environment can be implemented using a cloud computing architecture.

An embodiment also produces, in the classical computing environment, a quantum circuit that can be executed using the quantum computing environment. The embodiment executes the quantum circuit using the quantum computing environment.

An embodiment measures an execution efficiency of the quantum circuit's execution. One embodiment measures the time taken to execute the quantum circuit in a particular quantum computing environment. Another embodiment records outputs of the quantum circuit's execution, for use in comparing with a different version of the quantum circuit. Other execution efficiency measurements, and combinations of such measurements, are also possible and contemplated within the scope of the illustrative embodiments.

An embodiment determines a size of the quantum circuit. One embodiment determines quantum circuit size using the total number of gates in the circuit. Another embodiment determines quantum circuit size using the depth of the circuit. Other size measurements are also possible and contemplated within the scope of the illustrative embodiments. Although circuit size is one measure of efficiency, a smaller circuit is not always a more efficient circuit. For example, due to the configuration of qubits within a quantum processor, one quantum circuit may take longer to execute on that processor than a larger quantum circuit that is better adapted to the qubit configuration of that processor. As well, one more complex gate can be replaced by a configuration of simpler, easier-to-implement gates. For example, a SWAP gate, which exchanges the states of a pair of qubits, can be deconstructed into three CNOT gates.

An embodiment converts one or more of an execution efficiency and a size of the quantum circuit to obtain an efficiency score for the quantum circuit. One conversion technique includes normalizing each of the execution time, and the size of the quantum circuit to the same scale (e.g. 0 to 1) and computing a weighted average of the normalized values. An embodiment can be configured with different weights for each factor in the weighted average to weight one particular factor more highly than another. Other techniques of computing an efficiency score are also possible and contemplated within the scope of the illustrative embodiments.

An embodiment attempts to improve the quantum circuit, as measured by the efficiency score, by performing a transformation operation on the circuit. A transformation operation specifies one or more transformations to be performed on a quantum circuit to reconfigure the circuit into a different, but equivalent, quantum circuit. In other words, a transformation reconfigures a gate in the first quantum circuit such that a qubit used in the gate complies with a constraint on the quantum circuit design while participating in the first quantum circuit.

Reducing the number of gates in a quantum circuit improves circuit efficiency in many cases. Thus, one example transformation operation rearranges target and control inputs of gates, according to specific transformation rules, to remove redundant gates from a circuit.

It can be desirable, for ease of implementation and hardware efficiency, to implement a particular gate as a circuit of other, simpler or different, gates. For example, any 2-qubit gate can be decomposed into at most 3 CNOT gates. Thus, another example transformation operation decomposes a 2-qubit gate into CNOT gates.

A transformation operation can also be used to adapt a generic quantum circuit to a particular quantum processor configuration, or a particular calibration of that processor configuration. For example, a particular quantum processor might have a restriction on which qubits are coupled together, and hence able to communicate, with which other qubits. To adapt a circuit to this quantum processor, a transformation operation redistributes gates into different portions of a quantum circuit.

Thus, one or more transformation operations can be used to transform a generic input quantum circuit into a circuit that is both more efficient and adapted for a specific configuration of a specific quantum processor. As can be appreciated, the described examples of transformation operations are not intended to be limiting on the illustrative embodiments. Many types of analysis and transformation operations are possible and such other operations are contemplated within the scope of the illustrative embodiments.

To facilitate development and use of additional operations, an embodiment stores operations in an operation library. New operations can be added to the operation library, and obsolete operations removed, in a modular fashion, without affecting other operations in the library.

An embodiment maintains, for each operation in the operation library, an input circuit pattern to which the operation applies. For example, a SWAP gate can be deconstructed into a particular configuration of three CNOT gates. Thus, a SWAP gate is an input circuit pattern for a CNOT-deconstruction operation. Conversely, three CNOT gates, arranged in an appropriate configuration, are an input pattern for a transformation operation that replaces the three CNOT gates with one SWAP gate.

As another example, a CNOT operation between two qubits can be implemented with four CNOT operations using an intermediate qubit, so that there is no direct interaction between the original qubits. Consider a quantum circuit including a CNOT operation on $q_0$ and $q_2$. However, in one example quantum processor configuration, it may not be possible for $q_0$ and $q_2$ to interact with each other. Thus, the circuit's efficiency could be improved if the CNOT operation on $q_0$ and $q_2$ were replaced by a 4-CNOT circuit in which $q_0$ and $q_1$ interact, and $q_1$ and $q_2$ interact, but $q_0$ and $q_2$ no longer interact with each other. Here, the CNOT operation on $q_0$ and $q_2$ is an input pattern for a transformation operation that replaces that CNOT gate with its four-gate equivalent. Conversely, in another example quantum processor configuration, $q_0$ and $q_2$ can interact with each other. This circuit's efficiency could be improved if a 4-CNOT circuit in which $q_0$ and $q_1$ interact, and $q_1$ and $q_2$ interact, but $q_0$ and $q_2$ do not, were replaced by one CNOT gate operating on $q_0$ and $q_2$. Here, the 4-CNOT circuit is an input pattern for a transformation operation that replaces that circuit with one CNOT gate operating on $q_0$ and $q_2$.

An embodiment also maintains, for each operation in the operation library, processor configuration dependency information for the operation. Processor configuration dependency information relates a dependency of a particular transformation operation on a particular includes information on the properties of a particular configuration of a particular quantum processor at a particular time. A quantum processor can have varying properties, such as how long a qubit can remain in a particular quantum state before decaying to another quantum state, how long a qubit can remain in a superimposed state before decaying to a particular quantum state, the frequency of a particular qubit, gate error (i.e. the rate at which a quantum gate or operation gives an incorrect result), and the like. Quantum processors require periodic calibration to account for this variability.

Some transformation operations only apply to a particular processor configuration. For example, if, in a particular quantum processor configuration, $q_0$ and $q_2$ cannot interact with each other, a transformation operation to separate $q_0$ and $q_2$ may be needed. Processor configuration dependency information for the separation operation would be that this transformation should only be used if $q_0$ and $q_2$ cannot interact with each other. Thus, if the processor configuration changes such that $q_0$ and $q_2$ can interact with each other, this transformation should not be selected for use.

Other transformation operations are generic, applying to all processor configurations. For example, a SWAP gate can always be deconstructed into a particular configuration of three CNOT gates.

An embodiment receives configuration and calibration information for a specific quantum processor implementation. When new configuration and calibration information is received, the embodiment checks the new information against processor configuration dependency information for transformation operations in the library. If a transformation operation no longer applies to the new configuration, the embodiment removes that transformation operation from the library or marks that transformation operation as deprecated and not to be used.

An embodiment attempts to improve the quantum circuit, as measured by the efficiency score, by performing a transformation operation on the circuit. In particular, an embodiment identifies a portion of the quantum circuit that can be transformed using a transformation operation to satisfy a constraint on the quantum circuit design. To perform the identification, an embodiment uses any suitable pattern recognition technique to match, within a tolerance value, a portion of the quantum circuit with an input circuit pattern of a transformation operation in the library.

If only one pattern matches a portion of the quantum circuit, an embodiment selects the transformation operation corresponding to that input circuit pattern. If more than one pattern matches a portion of the quantum circuit, one embodiment selects the transformation operation corresponding to the largest input circuit pattern. Another embodiment selects the transformation operation corresponding to the smallest input circuit pattern. Another embodiment selects the transformation that produced the most improved efficiency score when used to transform a previous quantum circuit. Another embodiment selects the transformation operation corresponding to the input circuit pattern that best matches the portion. Other methods of selecting a transformation operation are also possible and contemplated within the scope of the illustrative embodiments.

If no pattern matches a portion of the quantum circuit, an embodiment generates a transformation operation. An embodiment can also be configured to generate a transformation operation even if a pattern matches a portion of the quantum circuit.

To generate a transformation, an embodiment uses a pseudorandom number generator. One embodiment uses a pseudorandom number generator to generate variations on known transformations (e.g. by substituting a randomly-chosen gate for an existing gate in the circuit). Generating transformation operations randomly allows for the discovery of new transformation operations that may be better that already-known transformation operations. A better transformation operation is one that produces a more efficient quantum circuit, as measured by the efficiency score, than a transformation operation currently in the library.

Another embodiment generates a transformation using a model that has been trained to generate transformation operations. In one embodiment, the model uses an artificial recurrent neuronal network (RNN) architecture. A non-limiting example of an RNN is a long short-term memory (LSTM). An LSTM helps preserve the error that can be backpropagated through time and layers. By maintaining a more constant error, an LSTM allows continued learning over many iterations (e.g. over 1000). Another non-limiting example of a suitable model is a Generative Adversarial Networks (GAN). A GAN includes two parts: a generative network to generates candidates (e.g. candidate transformation operations) while the discriminative network distinguishes generator-produced candidates from non-generator-produced candidates. Other model implementations are also possible and contemplated within the scope of the illustrative embodiments.

An embodiment executes a selected or generated transformation operation that applies to the identified portion of the quantum circuit. An embodiment then executes the transformed quantum circuit using the quantum computing environment.

An embodiment determines the correctness of the transformed quantum circuit by comparing outputs obtained by executing the transformed quantum circuit with outputs obtained by executing the original quantum circuit. If the execution outputs match by more than a threshold amount, the transformed quantum circuit is considered correct. If the transformed circuit is no longer correct, to within a threshold amount, the embodiment discards the transformed quantum circuit.

An embodiment measures an execution efficiency of the quantum computing environment's execution of the transformed quantum circuit, using the same measurement methodology as was used for the original quantum circuit. An embodiment determines a size of the quantum circuit, using the same size determination methodology as was used for the original quantum circuit. An embodiment converts one or more of the execution efficiency and the size determinations to obtain an efficiency score for the transformed quantum circuit, using the methodology as was used to compute the efficiency score for the original quantum circuit. If the transformation operation caused the efficiency score to increase less than a threshold amount, or to decrease, the embodiment discards the transformed quantum circuit.

Another embodiment is configurable to retain a transformed quantum circuit with outputs that match the original circuit's outputs by less than a threshold amount or having an efficiency score that increases less than a threshold amount. However, the transformation operation that produced a transformed quantum circuit meeting such criteria is flagged. If a further transformation operation or set of transformation operations on the circuit restores the circuit correctness to above the threshold correctness and increase the efficiency score above a threshold amount, the embodiment retains the further transformed quantum circuit. If a further transformation operation or set of transformation operations on the circuit do not restore the circuit correctness to above the threshold correctness and do not increase the efficiency score above a threshold amount, the embodiment discards changes to the quantum circuit back to and including the flagged transformation operation. Flagging a transformation operation in this manner allows an embodiment to temporarily sacrifice circuit correctness and efficiency for the possibility of an improved result after further transformations, while discarding circuit changes that do not result in further improvement.

An embodiment also evaluates a transformation operation for continued inclusion in the library or for another use. One embodiment retains a transformation operation in the library if the operation both retains circuit correctness and improves an efficiency score of the circuit by more than a threshold amount. The efficiency score improvement threshold amount for retention can be higher than, or the same as, the efficiency score improvement threshold amount for retaining a transformed quantum circuit. Using a higher threshold amount for retaining the threshold operation in the library ensures that only the best transformation operations are in the library, but risks discarding some transformation operations that are still useful.

A transformation operation under evaluation may operate on the same input pattern as a transformation operation currently in the library. However, if the new transformation operation both retains circuit correctness and improves an efficiency score of the circuit more than the stored transformation operation, an embodiment replaces the stored transformation operation with the new transformation operation. As a result, as new transformation operations that operate on the same input pattern are discovered, only the operation producing the most improvement is retained.

If an embodiment determines that a transformation operation is to be stored in the library, the embodiment can also be configured to use such a transformation operation to train a model described herein to generate additional transformation operations. An embodiment performs the training using any model training method known in the art.

An embodiment continues in this fashion, performing and evaluating transformation operations, until an end criterion is reached. In one embodiment, an end criterion is an efficiency score above a particular threshold. For example, an initial constraint on the transpilation process may have been to reduce the depth of the quantum circuit to a specified depth. Once the depth is at or below the specified depth, the circuit has been sufficiently transformed and transformation can end.

In another embodiment, an end criterion is an efficiency score improvement above a particular threshold. For example, an initial constraint on the transpilation process may have been to reduce the number of gates in the quantum circuit by ten percent. Once the number of gates has been reduced by ten percent or more, the circuit has been sufficiently transformed and transformation can end.

In another embodiment, an end criterion is the execution of a particular number of transformation operations. In another embodiment, an end criterion is a cumulative use of computing resources above a threshold amount. Execution limits such as these prevent a transformation process from executing infinitely, attempting to reach an unreachable state. Other end criteria, or combinations of end criteria, are also possible and contemplated within the scope of the illustrative embodiments.

The manner of modular quantum circuit transformation described herein is unavailable in the presently available methods. A method of an embodiment described herein, when implemented to execute on a device or data processing system, comprises substantial advancement of the functionality of a quantum circuit by generating a more optimized quantum circuit producing the same results as the original in a shorter time, with faster execution and using fewer resources, while discovering and applying additional optimizations.

The illustrative embodiments are described with respect to certain types of quantum circuits, quantum gates, qubits, quantum processors, thresholds, constraints, transformation operations, models, scores, end criteria, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, operations, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
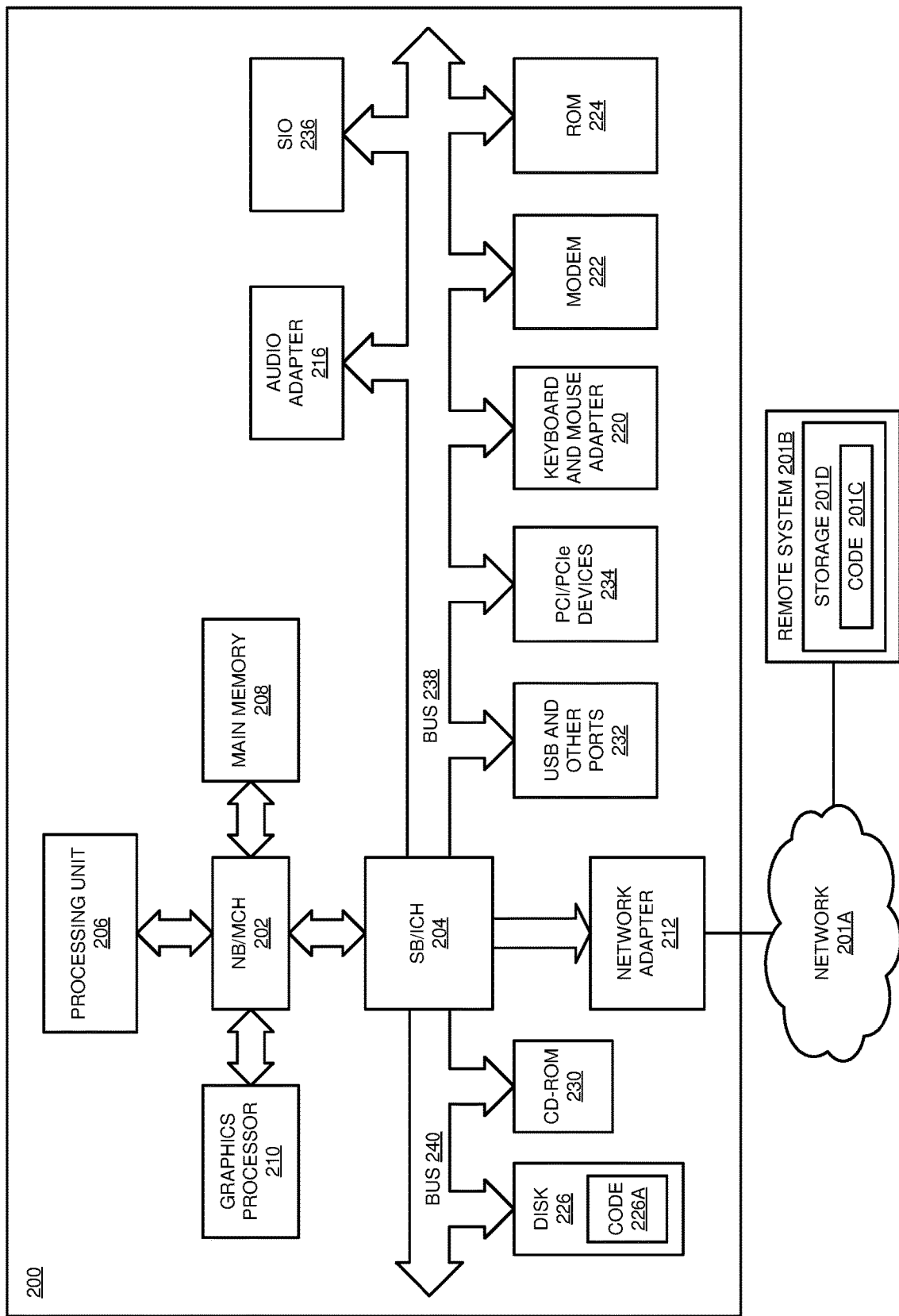
FIG. 2 depicts a block diagram of a conventional data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

QCE 140 is an example of a QCE described herein. As an example, QCE 140 includes CN 104, 106, and many other similar CNs 142. As an example, CNs 106 and 142 may be configured as cluster 144 of CNs. QCE 140 further includes one or more QCNs, such as QCN 146. A QCN, such as QCN 146, comprises one or more q-processors 148. A currently viable qubit is an example of q-processor 148. Application 105 implements an embodiment described herein. Application 105 operates on a CN, such as server 104 in QCE 140. Application 105 stores an operation library, circuits, and metadata in storage 108, or in any other suitable storage.

QCE 140 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 as a whole may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a conventional data processing system in which illustrative embodiments may be implemented. Data processing system 200 is an example of a classical computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as server 104 in FIG. 1 in which computer usable program code or instructions implementing the processes of the illustrative embodiments may be located. Data processing system 200 is described as a computer only as an example, without being limited thereto. Implementations in the form of other devices, such as server 104 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
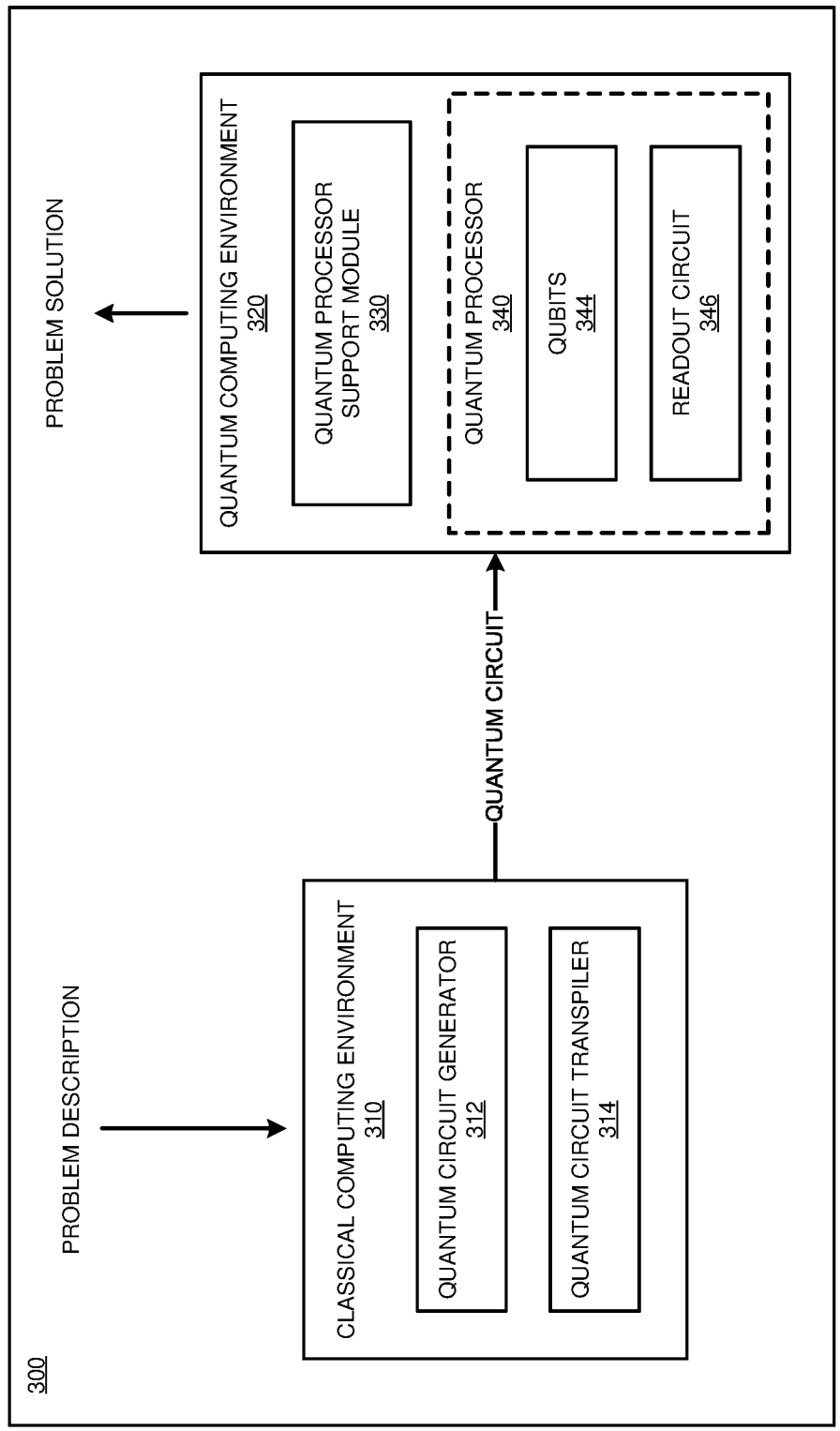
FIG. 3 depicts a block diagram of an example configuration for quantum circuit optimization using machine learning, and execution of the optimized quantum circuit, in accordance with an illustrative embodiment.

With reference to FIG. 3, this figure depicts a block diagram of an example configuration for quantum circuit optimization using machine learning, and execution of the optimized quantum circuit, in accordance with an illustrative embodiment. Cloud 300 is an example of QCE 140 in FIG. 1. Classical computing environment 310 is an example of CCN 104 in FIG. 1. Quantum computing environment 320 is an example of QCN 146 in FIG. 1. Applications 312 and 314 are examples of application 105 in FIG. 1 and execute in server 104 in FIG. 1, or any other suitable device in FIG. 1.

Within classical computing environment 310, quantum circuit generator 312 receives a problem description as an input, and generates a corresponding quantum circuit. Quantum circuit transpiler 314 transpiles the quantum circuit into a different but equivalent quantum circuit.

Then, within quantum computing environment 320, quantum processor 340, including qubits 344 and readout circuit 346, executes the transpiled quantum circuit. Quantum computing environment 320 also includes quantum processor support module 330, which outputs the results of executing the quantum circuit as a solution to the original input problem description.

Figure 4:
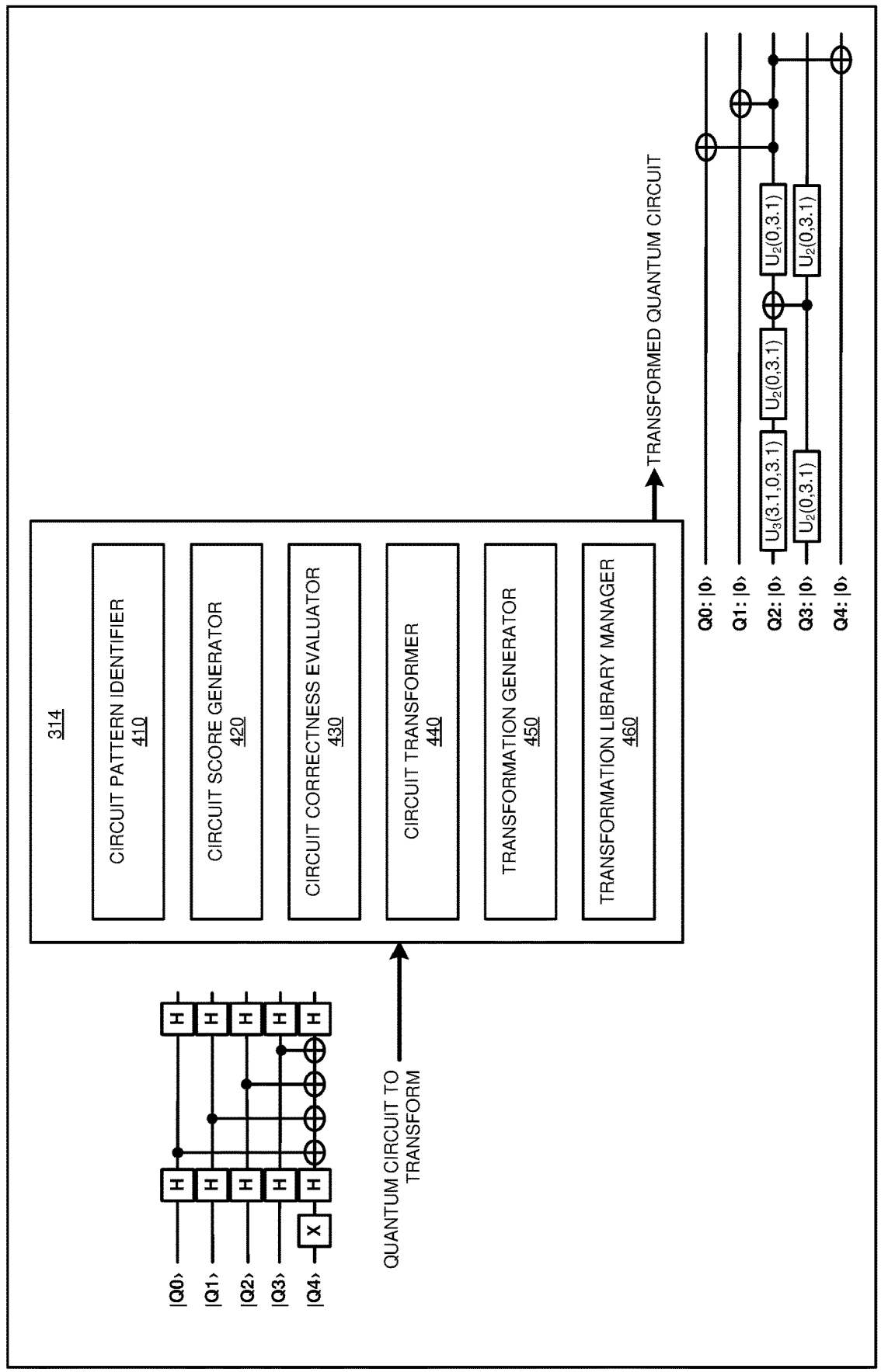
FIG. 4 depicts a block diagram of an example configuration for quantum circuit optimization using machine learning in accordance with an illustrative embodiment.

With reference to FIG. 4, this figure depicts a block diagram of an example configuration for quantum circuit optimization using machine learning in accordance with an illustrative embodiment. Application 314 is the same as quantum circuit transpiler 314 in FIG. 3.

Circuit pattern identifier 410 identifies a portion of the quantum circuit that can be transformed using a transformation operation to satisfy a constraint on the quantum circuit design. In particular, module 410 uses a pattern recognition technique to match, within a tolerance value, a portion of the quantum circuit with an input circuit pattern of a transformation operation in the library.

Circuit score generator 420 generates an efficiency score measuring an execution efficiency of a quantum circuit's execution. One component of an efficiency score is the time taken to execute a quantum circuit in a particular quantum computing environment. Another component of an efficiency score is a size of the quantum circuit, determined using the total number of gates in the circuit, the depth of the circuit, or another size measurement. To generate an overall efficiency score, module 420 normalizes each of the execution time, and the size of the quantum circuit to the same scale, then computes a weighted average of the normalized values. Module 420 can be configured with different weights for each factor in the weighted average to weight one particular factor more highly than another.

Circuit correctness evaluator 430 determines the correctness of a transformed quantum circuit by comparing outputs obtained by executing the transformed quantum circuit with outputs obtained by executing a previous version of the transformed quantum circuit. If the execution outputs match by more than a threshold amount, the transformed quantum circuit is considered correct.

Circuit transformer 440 performs a transformation operation on a quantum circuit to reconfigure the circuit into a different, but equivalent, quantum circuit. Application 314 can generate the transformation operation to be performed, or select the transformation operation from a transformation operation library.

Transformation generator 450 generates transformation operations. In one configuration, transformation generator 440 uses a pseudorandom number generator. In another configuration, transformation generator 440 uses a model that has been trained to generate transformation operations, such as an LSTM or a GAN.

Transformation library manager 460 stores transformation operations in an operation library. Module 460 also removes obsolete or deprecated operations from the library, and replaces operations with more successful operations. Module 460 also maintains, for each operation in the operation library, an input circuit pattern to which the operation applies. Module 460 also maintains, for each operation in the operation library, processor configuration dependency information for the operation. When new configuration and calibration information is received, module 460 checks the new information against processor configuration dependency information for transformation operations in the library. If a transformation operation no longer applies to the new configuration, the embodiment removes that transformation operation from the library or marks that transformation operation as deprecated and not to be used.

Figure 5:
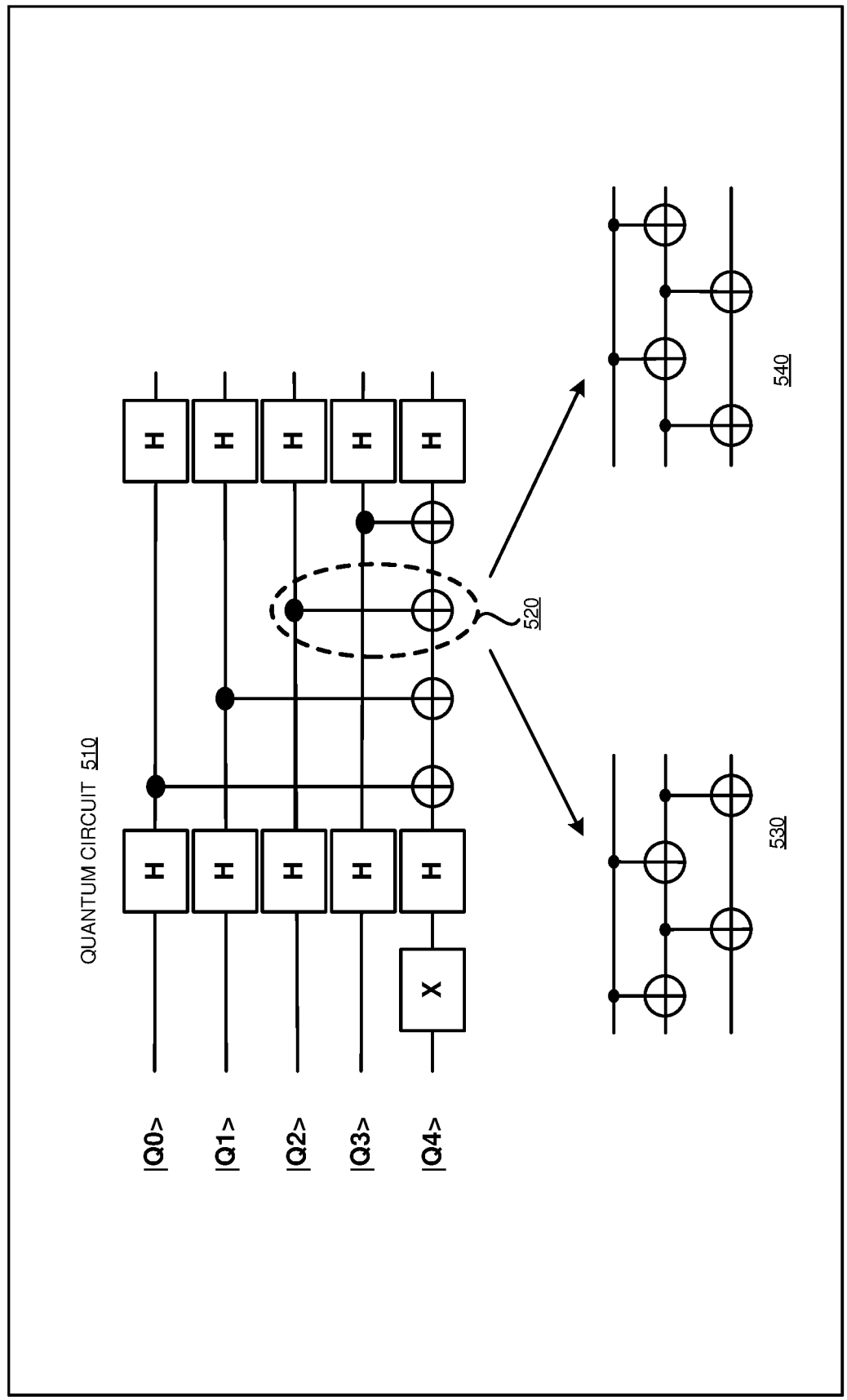
FIG. 5 depicts an example of possible circuit transformations usable for quantum circuit optimization using machine learning in accordance with an illustrative embodiment.

With reference to FIG. 5, this figure depicts an example of possible circuit transformations usable for quantum circuit optimization using machine learning in accordance with an illustrative embodiment. The depicted transformations can be performed using quantum circuit transpiler 314 in FIG. 3.

Quantum circuit 510 is an example input circuit that can be transformed using application 314. In particular, quantum circuit 510 includes section 520—a CNOT operation on $q_2$ and $q_4$. However, in the quantum processor configuration to which circuit 510 is targeted, it may not be possible for $q_2$ and $q_4$ to interact with each other. Thus, circuit 510's efficiency could be improved if the CNOT operation on $q_2$ and $q_4$ were replaced by a 4-CNOT circuit in which $q_2$ and $q_4$ no longer interact with each other. Sections 530 and 540 depict replacements for section 520 in which $q_2$ and $q_3$ interact, and $q_3$ and $q_4$ interact, but $q_2$ and $q_4$ no longer interact with each other.

Figure 6:
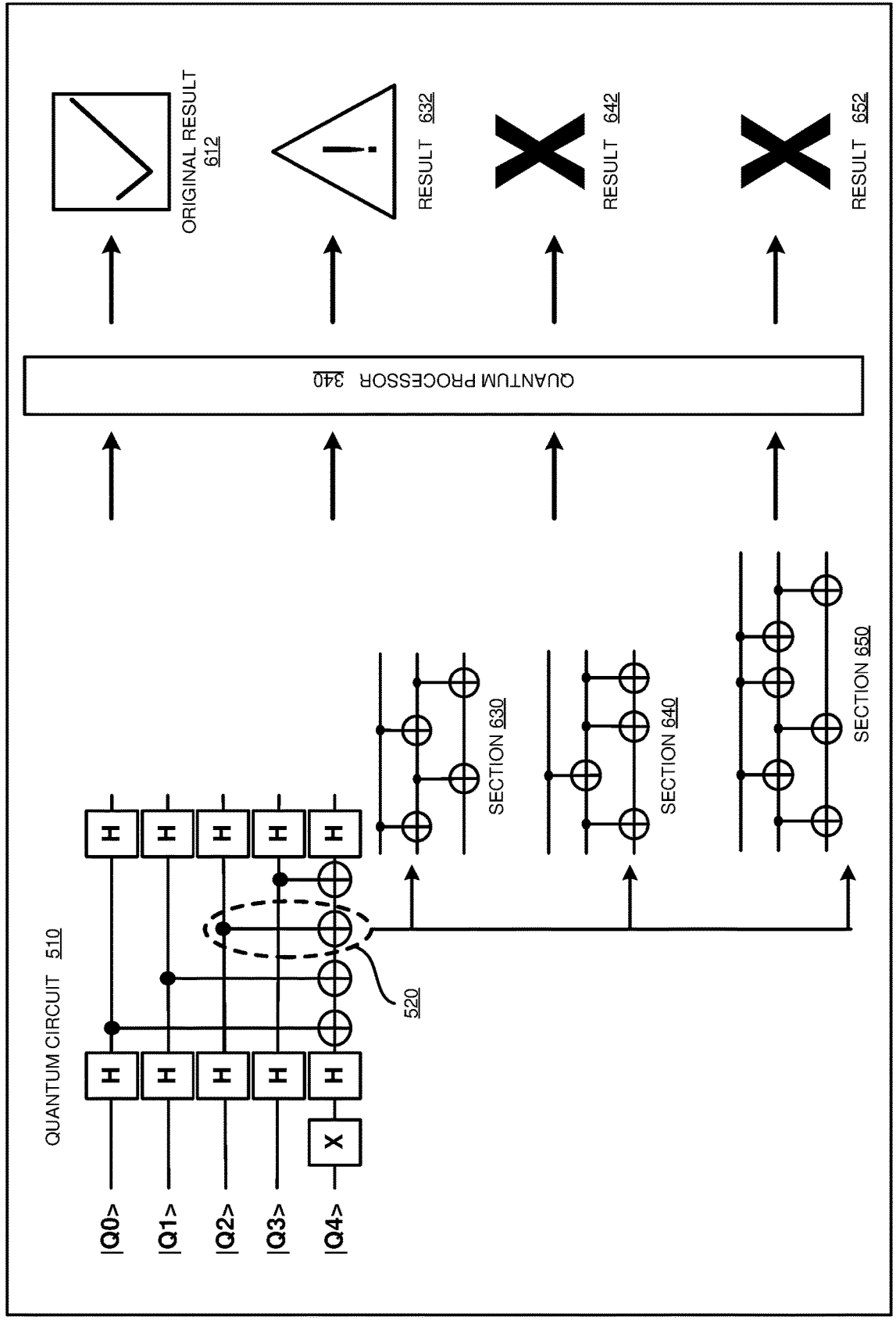
FIG. 6 depicts an example of evaluating quantum circuit optimizations using machine learning in accordance with an illustrative embodiment.

With reference to FIG. 6, this figure depicts an example of evaluating quantum circuit optimizations using machine learning in accordance with an illustrative embodiment. The depicted transformations can be performed using quantum circuit transpiler 314 in FIG. 3. Quantum processor 340 is the same as quantum processor 340 in FIG. 3. Quantum circuit 510 and section 520 are the same as quantum circuit 510 and section 520 in FIG. 4.

In the depicted example, application 314 has transformed section 520 into each of section 630, section 640, and section 650. Application 300 has executed circuit 510, generating original result 612. Application 300 has also executed the quantum circuits resulting from implementing sections 630, 640, and 650, generating results 632, 642, and 652 respectively. Application 314 has also determined the correctness of the transformed quantum circuit by comparing each of results 632, 642, and 652 with original result 612. Application 314 has also determined an efficiency score for each of original result 612 and results 632, 642, and 652.

Here, the application's evaluation indicates that the circuit generating result 632 is equivalent to original result 612, but includes more gates than circuit 510. If the application determines efficiency solely by circuit size, the circuit generating result 632 is less efficient than circuit 510. However, if the application determines efficiency by execution time, the circuit generating result 632 may execute faster than circuit 510 because of the difference in qubit interactions. The application's evaluation also indicates that the circuits generating results 642 and 652 are incorrect.

Figure 7:
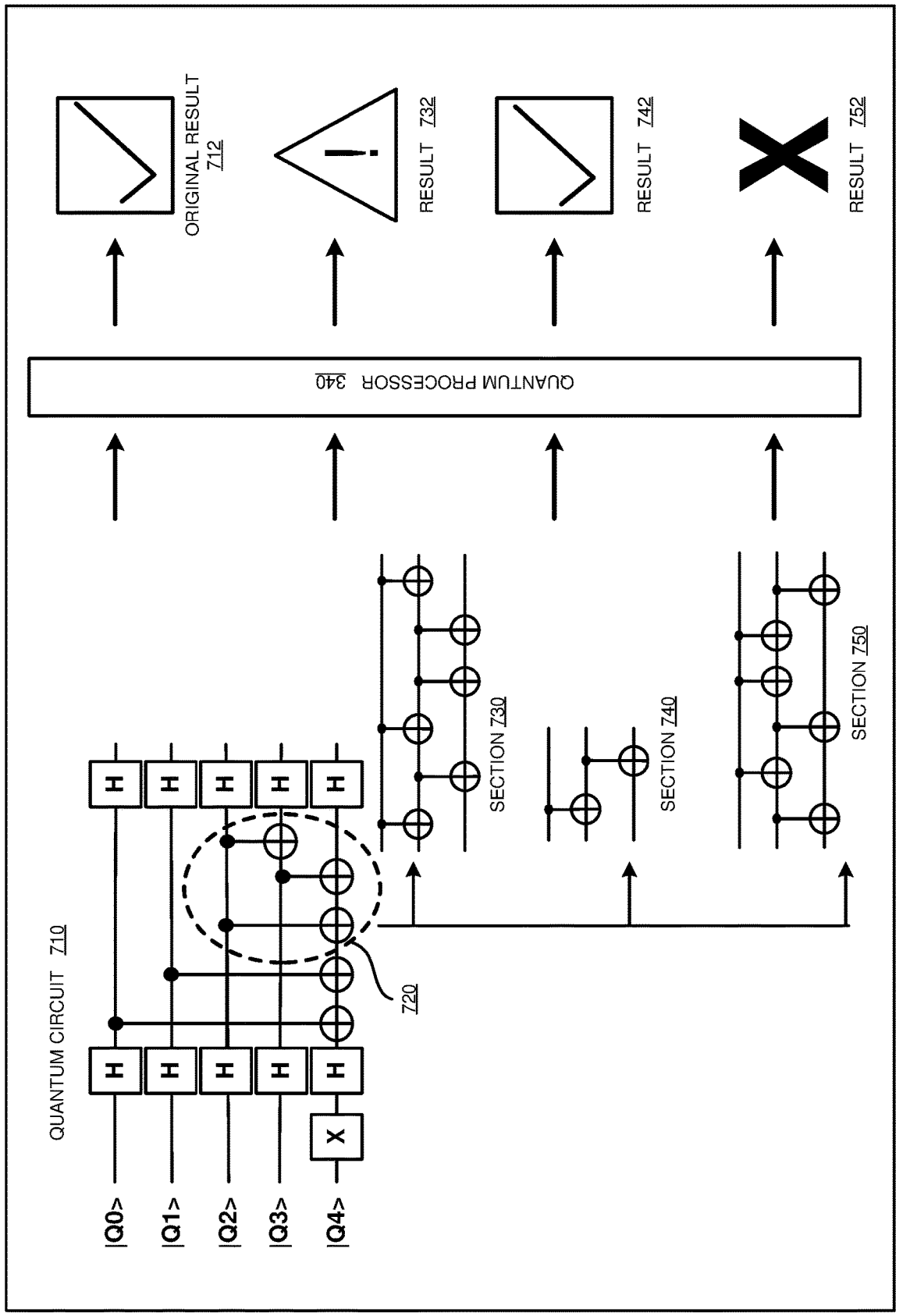
FIG. 7 depicts another example of evaluating quantum circuit optimizations using machine learning in accordance with an illustrative embodiment.

With reference to FIG. 7, this figure depicts another example of evaluating quantum circuit optimizations using machine learning in accordance with an illustrative embodiment. The depicted transformations can be performed using quantum circuit transpiler 314 in FIG. 3. Quantum processor 340 is the same as quantum processor 340 in FIG. 3.

In the depicted example, application 314 has transformed section 720 of quantum circuit 710 into each of section 730, section 740, and section 750. Application 300 has executed circuit 710, generating original result 712. Application 300 has also executed the quantum circuits resulting from implementing sections 730, 740, and 750, generating results 732, 742, and 752 respectively. Application 314 has also determined the correctness of the transformed quantum circuit by comparing each of results 732, 742, and 752 with original result 712. Application 314 has also determined an efficiency score for each of original result 712 and results 732, 742, and 752.

Here, the application's evaluation indicates that the circuit generating result 732 is equivalent to original result 712, but includes more gates than circuit 710. If the application determines efficiency solely by circuit size, the circuit generating result 732 is less efficient than circuit 710. However, if the application determines efficiency by execution time, the circuit generating result 732 may execute faster than circuit 710 because of the difference in qubit interactions. The application's evaluation also indicates that the circuit generating result 742 is equivalent to original result 712 and includes fewer gates than circuit 710. Here, the application has also determined that the circuit generating result 742 executes faster than circuit 710. The application's evaluation also indicates that the circuit generating result 652 is incorrect.

Figure 8:
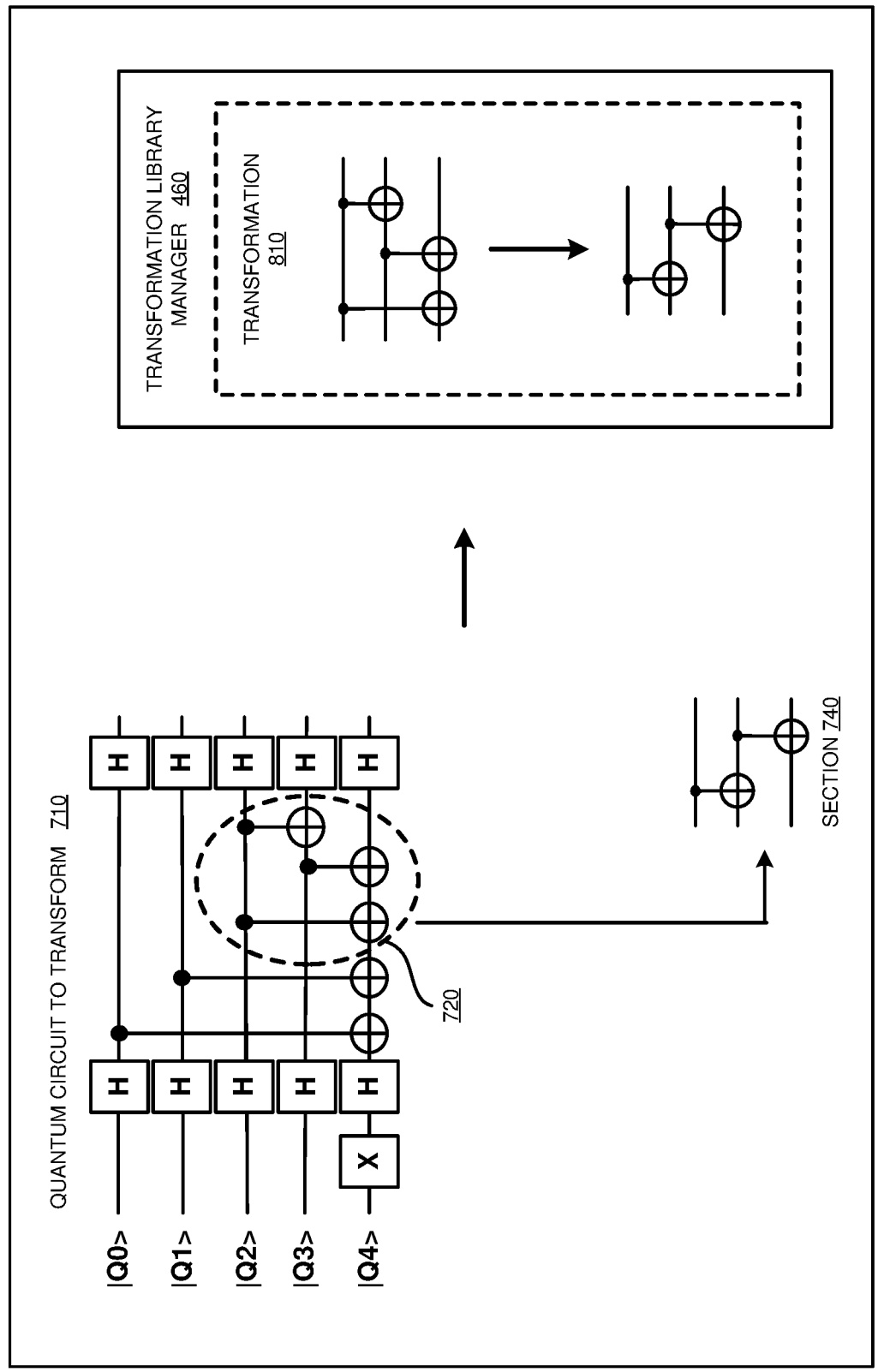
FIG. 8 depicts an example of quantum circuit optimization using machine learning in accordance with an illustrative embodiment.

With reference to FIG. 8, this figure depicts an example of quantum circuit optimization using machine learning in accordance with an illustrative embodiment. The depicted transformations can be performed using quantum circuit transpiler 314 in FIG. 3. Quantum processor 340 is the same as quantum processor 340 in FIG. 3. Transformation library manager 460 is the same as transformation library manager 460 in FIG. 4. Quantum circuit 710, section 720, and section 740 are the same as quantum circuit 710, section 720, and section 740 in FIG. 7.

Here, because the circuit generating result 742 was evaluated as both equivalent to original result 712 and more efficient than circuit 710, the application has determined that the transformation operation that transformed section 720 into section 740 (transformation 810) should be saved in the transformation library. As a result, transformation library manger 460 now includes transformation 810 in the transformation library.

Figure 9:
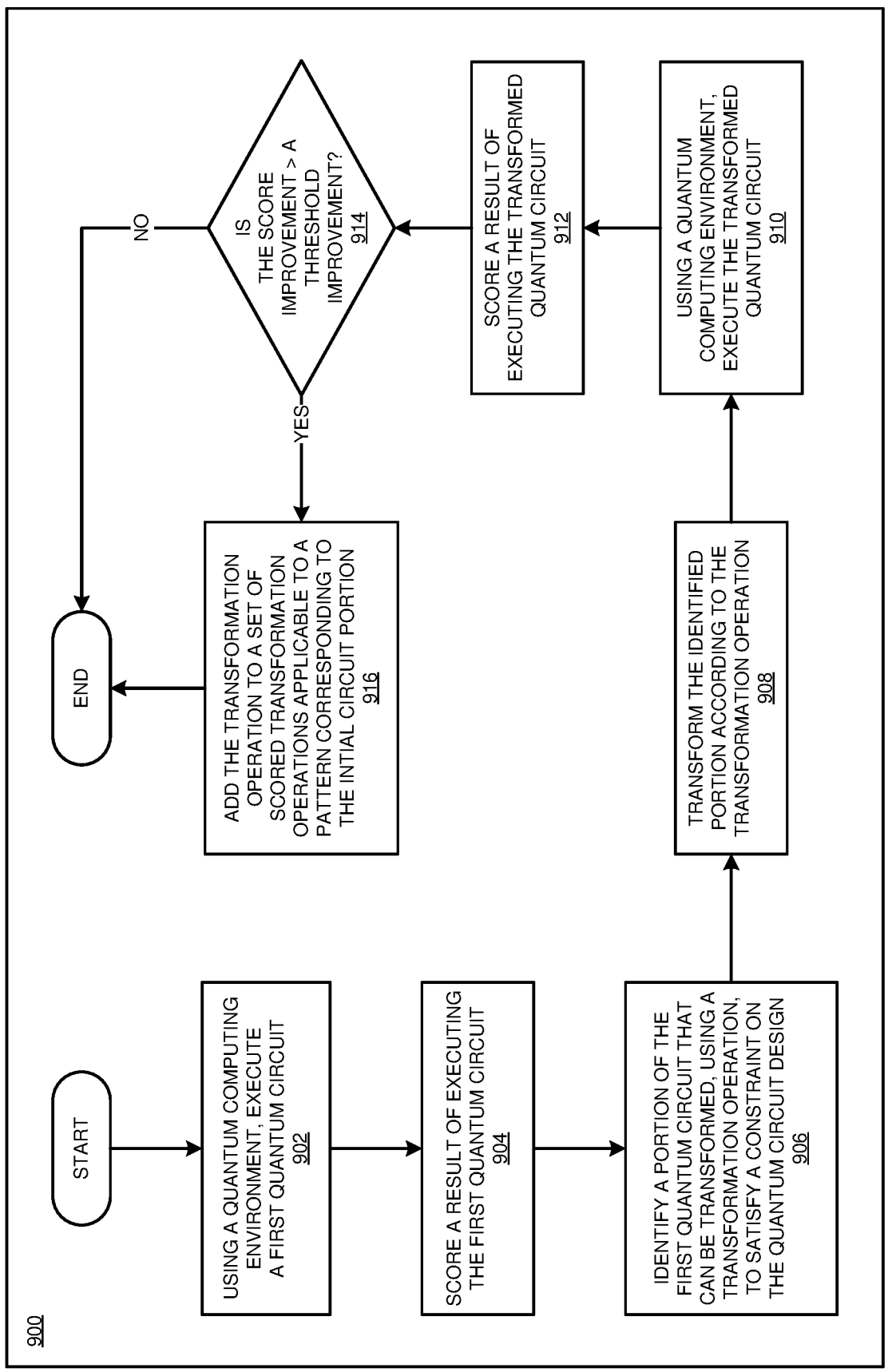
FIG. 9 depicts a flowchart of an example application for quantum circuit optimization using machine learning in accordance with an illustrative embodiment.

With reference to FIG. 9, this figure depicts a flowchart of an example application for quantum circuit optimization using machine learning in accordance with an illustrative embodiment. Application 900 can be implemented in quantum circuit transpiler 314 in FIG. 3.

In block 902, the application uses a quantum computing environment to execute a quantum circuit. In block 904, the application scores the result of executing the quantum circuit. In block 906, the application identifies a portion of the quantum circuit that can be transformed to satisfy a constraint on the quantum circuit design. In block 908, the application transforms the identified portion according to the transformation operation. In block 910, the application uses the quantum computing environment to execute the transformed quantum circuit. In block 912, the application scores the result of executing the transformed quantum circuit. In block 914, the application checks whether the score has improved more than a threshold amount. If yes, in block 916 ("YES" path of block 914) the application adds the transformation operation to a set of scored transformation operations that apply to a pattern corresponding to the initial circuit portion. Then (also "NO" path of block 914) the application ends.

Thus, a computer implemented method, system or apparatus, and computer program product are provided in the illustrative embodiments for quantum circuit optimization using machine learning and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   configuring a hybrid data processing environment comprising a classical computing system and a quantum computing system;
   producing a configuration of a first quantum circuit from the classical computing system, the first quantum circuit being executable using the quantum computing system;
   executing, using the quantum computing system, the first quantum circuit;
   scoring, to produce a first score, a result of executing the first quantum circuit;
   identifying, using a pattern recognition technique, a portion of the first quantum circuit that can be transformed using a first transformation operation to satisfy a constraint on the quantum circuit design;
   transforming, to a second quantum circuit according to the first transformation operation, the portion, wherein the first transformation operation comprises reconfiguring a gate in the first quantum circuit such that a qubit used in the gate complies with the constraint on the quantum circuit design while participating in the second quantum circuit; and
   executing, using the quantum computing system, the second quantum circuit.

2. The method of claim 1, further comprising:
   determining, by comparing an execution result of the first quantum circuit with an execution result of the second quantum circuit, a correctness of the second quantum circuit; and
   scoring, to produce a second score, a result of executing the second quantum circuit.

3. The method of claim 2, further comprising:
   discarding, responsive to the correctness being lower than a correctness threshold, the second quantum circuit.

4. The method of claim 2, further comprising:
   adding, responsive to an improvement from the first score to the second score being higher than an improvement threshold and responsive to the correctness being higher than a correctness threshold, the first transformation operation to a set of scored transformation operations applicable to a pattern corresponding to the portion.

5. The method of claim 1, wherein the portion comprises a pattern.

6. The method of claim 5, wherein the portion includes more components than the pattern.

7. The method of claim 5, wherein the pattern is functionally equivalent to a second pattern, wherein the portion is replaced by a second portion comprising the second pattern in the second quantum circuit.

8. The method of claim 1, wherein the first transformation operation is selected from a set of stored transformation operations.

9. The method of claim 1, wherein the first transformation operation is generated using a transformation operation model and a pseudorandom number based application.

10. The method of claim 1, wherein a constraint on the quantum circuit design is a maximum number of gates in the quantum circuit design, wherein the first transformation operation reduces a number of gates in the second quantum circuit relative to a number of gates in the first quantum circuit.

11. The method of claim 1, wherein a constraint on the quantum circuit design is a prohibition of the interaction of a set of qubits in the quantum circuit design, wherein the first transformation operation reconfigures the second quantum circuit such that the set of qubits do not interact.

12. The method of claim 1, wherein the scoring comprises:
   measuring an execution efficiency of the executing of the first quantum circuit;
   determining a size of the first quantum circuit; and
   combining, into the first score, the execution efficiency and the size.

13. A computer usable program product comprising one or more computer-readable storage devices, and program instructions stored on at least one of the one or more storage devices, the stored program instructions comprising:

program instructions to configure a hybrid data processing environment comprising a classical computing system and a quantum computing system;

program instructions to produce a configuration of a first quantum circuit from the classical computing system, the first quantum circuit being executable using the quantum computing system;

program instructions to execute, using the quantum computing system, the first quantum circuit;

program instructions to score, to produce a first score, a result of executing the first quantum circuit;

program instructions to identify, using a pattern recognition technique, a portion of the first quantum circuit that can be transformed using a first transformation operation to satisfy a constraint on the quantum circuit design;

program instructions to transform, to a second quantum circuit according to the first transformation operation, the portion, wherein the first transformation operation comprises reconfiguring a gate in the first quantum circuit such that a qubit used in the gate complies with the constraint on the quantum circuit design while participating in the second quantum circuit; and program instructions to execute, using the quantum computing system, the second quantum circuit.

14. The computer usable program product of claim 13, further comprising:

program instructions to determine, by comparing an execution result of the first quantum circuit with an execution result of the second quantum circuit, a correctness of the second quantum circuit; and program instructions to score, to produce a second score, a result of executing the second quantum circuit.

15. The computer usable program product of claim 14, further comprising:

program instructions to discard, responsive to the correctness being lower than a correctness threshold, the second quantum circuit.

16. The computer usable program product of claim 14, further comprising:

program instructions to add, responsive to an improvement from the first score to the second score being higher than an improvement threshold and responsive to the correctness being higher than a correctness threshold, the first transformation operation to a set of scored transformation operations applicable to a pattern corresponding to the portion.

17. The computer usable program product of claim 13, wherein the portion comprises a pattern.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to configure a hybrid data processing environment comprising a classical computing system and a quantum computing system;

program instructions to produce a configuration of a first quantum circuit from the classical computing system, the first quantum circuit being executable using the quantum computing system;

program instructions to execute, using the quantum computing system, the first quantum circuit;

program instructions to score, to produce a first score, a result of executing the first quantum circuit;

program instructions to identify, using a pattern recognition technique, a portion of the first quantum circuit that can be transformed using a first transformation operation to satisfy a constraint on the quantum circuit design;

program instructions to transform, to a second quantum circuit according to the first transformation operation, the portion, wherein the first transformation operation comprises reconfiguring a gate in the first quantum circuit such that a qubit used in the gate complies with the constraint on the quantum circuit design while participating in the second quantum circuit; and program instructions to execute, using the quantum computing system, the second quantum circuit.

* * * * *